(12) United States Patent
Gopalakrishnan et al.

(10) Patent No.: US 10,949,804 B2
(45) Date of Patent: Mar. 16, 2021

(54) TOTE BASED ITEM TRACKING

(71) Applicant: Amazon Technologies, Inc., Reno, NV (US)

(72) Inventors: Varadarajan Gopalakrishnan, Cupertino, CA (US); Subram Narasimhan, Saratoga, CA (US); Omar FawazHashim Zakaria, San Jose, CA (US); Dilip Kumar, Seattle, WA (US); Sridhar Boyapati, Sammamish, WA (US); Jin Dong Kim, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/902,767

(22) Filed: May 24, 2013

(65) Prior Publication Data

US 2014/0350710 A1     Nov. 27, 2014

(51) Int. Cl.
 *G06Q 10/08* (2012.01)
 *B65G 1/137* (2006.01)

(52) U.S. Cl.
 CPC ....... *G06Q 10/0875* (2013.01); *B65G 1/1375* (2013.01)

(58) Field of Classification Search
 CPC ....... G06Q 10/087; G06Q 10/06; G06Q 10/08
 USPC ......................................... 700/213
 See application file for complete search history.

(56) References Cited

U.S. PATENT DOCUMENTS

| | | |
|---|---|---|
| 6,236,736 B1 | 5/2001 | Crabtree et al. |
| 6,659,344 B2 | 12/2003 | Otto et al. |
| 7,225,980 B2 | 6/2007 | Ku et al. |
| 7,522,057 B2 | 4/2009 | Stern et al. |
| 7,949,568 B2 | 5/2011 | Fano et al. |
| 7,983,448 B1 | 7/2011 | Lobo et al. |
| 8,009,864 B2 | 8/2011 | Linaker et al. |
| 8,094,026 B1 | 1/2012 | Green |
| 8,175,925 B1 | 5/2012 | Rouaix |
| 8,189,855 B2 | 5/2012 | Opalach et al. |
| 8,264,422 B1 | 9/2012 | Persson et al. |
| 8,423,431 B1 | 4/2013 | Rouaix et al. |

(Continued)

FOREIGN PATENT DOCUMENTS

| | | |
|---|---|---|
| CN | 101014517 A | 8/2007 |
| CN | 101808916 A | 8/2010 |

(Continued)

OTHER PUBLICATIONS

"International Search Report and Written Opinion of PCT Application No. PCT/US2014/039474 with a mailing date of Oct. 17, 2014."

(Continued)

*Primary Examiner* — Kyle Logan
(74) *Attorney, Agent, or Firm* — Athorus, PLLC

(57) ABSTRACT

This disclosure describes a system for managing inventory as it transitions into a materials handling facility, as it transitions between locations within a materials handling facility and/or as it transitions out of a materials handling facility. In some instances, a user (e.g., picker or picking agent) may retrieve an item from an inventory location and place the item into a tote. The systems described herein detect the item when it is added to or removed from the tote.

24 Claims, 10 Drawing Sheets

(56) References Cited

U.S. PATENT DOCUMENTS

| | | | |
|---|---|---|---|
| 8,571,702 | B1 | 10/2013 | Haake et al. |
| 8,630,924 | B2 | 1/2014 | Bernard |
| 8,678,281 | B2 | 3/2014 | Kangas et al. |
| 8,688,598 | B1 | 4/2014 | Shakes et al. |
| 8,726,195 | B2 | 5/2014 | Bill |
| 9,235,928 | B2 | 1/2016 | Medioni et al. |
| 9,473,747 | B2 | 10/2016 | Kobres et al. |
| 9,505,554 | B1 | 11/2016 | Kong et al. |
| 2002/0113123 | A1* | 8/2002 | Otto ............... G06K 17/0022 235/381 |
| 2003/0002712 | A1 | 1/2003 | Steenburgh et al. |
| 2004/0181467 | A1 | 9/2004 | Raiyani et al. |
| 2005/0189412 | A1 | 9/2005 | Hudnut et al. |
| 2006/0256082 | A1 | 11/2006 | Cho et al. |
| 2008/0019589 | A1 | 1/2008 | Yoon et al. |
| 2008/0040246 | A1 | 2/2008 | Fukamachi |
| 2008/0055087 | A1 | 3/2008 | Horii et al. |
| 2008/0055194 | A1 | 3/2008 | Baudino et al. |
| 2008/0059570 | A1 | 3/2008 | Bill |
| 2008/0068170 | A1 | 3/2008 | Ehrman et al. |
| 2008/0077511 | A1 | 3/2008 | Zimmerman |
| 2008/0109114 | A1 | 5/2008 | Orita et al. |
| 2008/0157967 | A1* | 7/2008 | Jones ............... G01G 15/00 340/572.1 |
| 2008/0183326 | A1 | 7/2008 | Danelski |
| 2008/0260212 | A1 | 10/2008 | Moskal et al. |
| 2008/0272914 | A1 | 11/2008 | Murray et al. |
| 2009/0000912 | A1 | 1/2009 | Battles et al. |
| 2009/0066513 | A1 | 3/2009 | Kondo et al. |
| 2009/0121017 | A1 | 5/2009 | Cato et al. |
| 2009/0245573 | A1 | 10/2009 | Saptharishi et al. |
| 2009/0302106 | A1* | 12/2009 | Satou ............... G06Q 20/203 235/383 |
| 2010/0117959 | A1 | 5/2010 | Hong et al. |
| 2010/0138037 | A1 | 6/2010 | Adelberg et al. |
| 2010/0277277 | A1 | 11/2010 | Green et al. |
| 2011/0011936 | A1 | 1/2011 | Morandi et al. |
| 2011/0242025 | A1 | 10/2011 | Wen et al. |
| 2011/0295644 | A1 | 12/2011 | Nara et al. |
| 2012/0284132 | A1 | 11/2012 | Kim et al. |
| 2013/0002443 | A1 | 1/2013 | Breed et al. |
| 2013/0035950 | A1 | 2/2013 | MacDonald et al. |
| 2013/0054333 | A1 | 2/2013 | Ross et al. |
| 2013/0073703 | A1 | 3/2013 | Das et al. |
| 2013/0076898 | A1 | 3/2013 | Philippe et al. |
| 2013/0110565 | A1 | 5/2013 | Means et al. |
| 2013/0126611 | A1* | 5/2013 | Kangas ............... G07G 1/009 235/385 |
| 2013/0253700 | A1 | 9/2013 | Carson et al. |
| 2013/0265232 | A1 | 10/2013 | Yun et al. |
| 2013/0284806 | A1 | 10/2013 | Margalit |
| 2013/0290106 | A1 | 10/2013 | Bradley et al. |
| 2014/0164176 | A1* | 6/2014 | Kitlyar ............... G06Q 30/0633 705/26.8 |
| 2014/0244429 | A1 | 8/2014 | Clayton et al. |
| 2014/0244447 | A1 | 8/2014 | Kim et al. |
| 2014/0244488 | A1 | 8/2014 | Kim et al. |
| 2014/0279294 | A1 | 9/2014 | Field-Darragh et al. |
| 2014/0279713 | A1 | 9/2014 | Calman et al. |
| 2014/0362223 | A1 | 12/2014 | LaCroix et al. |
| 2015/0012426 | A1 | 1/2015 | Purves et al. |
| 2015/0019391 | A1 | 1/2015 | Kumar et al. |
| 2015/0073907 | A1 | 3/2015 | Purves et al. |

FOREIGN PATENT DOCUMENTS

| | | |
|---|---|---|
| JP | 2001128814 A | 5/2001 |
| JP | 2002128230 A | 5/2002 |
| JP | 2002284317 A | 10/2002 |
| JP | 2003054753 A | 2/2003 |
| JP | 2004262587 A | 9/2004 |
| JP | 2008532888 A | 8/2008 |
| WO | 2006028086 A1 | 3/2006 |
| WO | 2006098943 A1 | 9/2006 |
| WO | 2013016803 A1 | 2/2013 |

OTHER PUBLICATIONS

Abhaya Asthana et al., "An Indoor Wireless System for Personalized Shopping Assistance (1994)", "In Proceedings of IEEE Workshop on Mobile Computing Systems and Applications", 1994, pp. 6974, Publisher: Eee Computer Society Press.

Cristian Pop, "Introduction to the BodyCom Technology", "Microchip AN1391", May 2, 2011, pp. 126, vol. AN1391, No. DS01391A, Publisher: 2011 Microchip Technology Inc.

Vaiva Kalnikaite et al, "How to Nudge in Situ: Designing Lambent Devices to Deliver Information Salience in Supermarkets", "UbiComp '11 Proceedings of the 13th International Conference on Ubiquitous Computing", 2011, 'age(s) 11-20, Publisher: ACM New York, NY, USA.

International Preliminary Report on Patentability for International Application No. PCT/US2014/039474 dated Dec. 3, 2015.

International Preliminary Report on Patentability of PCT Application No. PCT/US2014/043033, dated Dec. 29, 2015.

International Search Report and Written Opinion of PCT Application No. PCT/US2014/043033, dated Oct. 29, 2014.

Extended European Search report for EP Application No. EP 14817650.6 dated Sep. 16, 2016.

First Office Action for Japanese Patent Application No. 2016-515139 dated Mar. 6, 2017.

Japanese Office Action for JP Patent Application No. 2016-523802 dated Feb. 13, 2017.

Search Report for Chinese Patent Application No.: 201480041648.1 dated Sep. 29, 2018.

Anonymous: "Electromagnetic shielding—Wikipedia", May 20, 2013, (May 20, 2013), XP055624584, Retrieved from he Internet: URL:https://en.wikipedia.org/w/index.php?itle=Electromagnetic_shielding&oldid=555925442 [retrieved on Sep. 20, 2019].

Ikawa, "Tag movement direction estimation methods in an RFID gate system", Wireless Communication Systems, 2009. ISWCS 2009. 6TH International Symposium on, IEEE, Piscataway, NJ, USA, Sep. 7, 2009, pp. 41-45.

Editorial Department of E-Newspaper, University of Electronic Science and Technology Press, Bound Volume of E-Newspaper 2012, Dec. 31, 2012, p. 101.

Jiang Pingyu, "Computer-Aided Design and Manufacturing Technology", Xi'an Jiaotong University Press, Feb. 28, 2010, pp. 171-173.

Search Report dated Nov. 4, 2019, for corresponding CN Application No. 201480041648.1.

Wang Wei et al., "Key Technology of Cold Chain Transportation and Logistics Distribution of High Quality Pork", Sichuan Science and Technology Press, May 31, 2011, pp. 45-47.

Zhu Youfa et al., "New Introduction to Modern Logistics Management", Aviation Industry Press, Jan. 31, 2012, pp. 119-121.

* cited by examiner

TOTE BASED ITEM TRACKING

BACKGROUND

Retailers, wholesalers, and other product distributors typically maintain an inventory of various items that may be ordered, purchased, leased, borrowed rented, viewed, etc. by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can pick items from inventory and take them to a cashier for purchase, rental, etc. Many of those physical stores also maintain inventory in a storage area, or fulfillment centers that can be used to replenish inventory located in the shopping areas and/or to satisfy orders for items that are placed through other channels (e.g., e-commerce). Other examples of entities that maintain inventory include libraries, museums, rental centers, and the like. In each instance, for an item to be moved from one location to another, it is picked from its current location and transitioned to a new location. It is often desirable to track the transition of inventory and/or the location of inventory.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
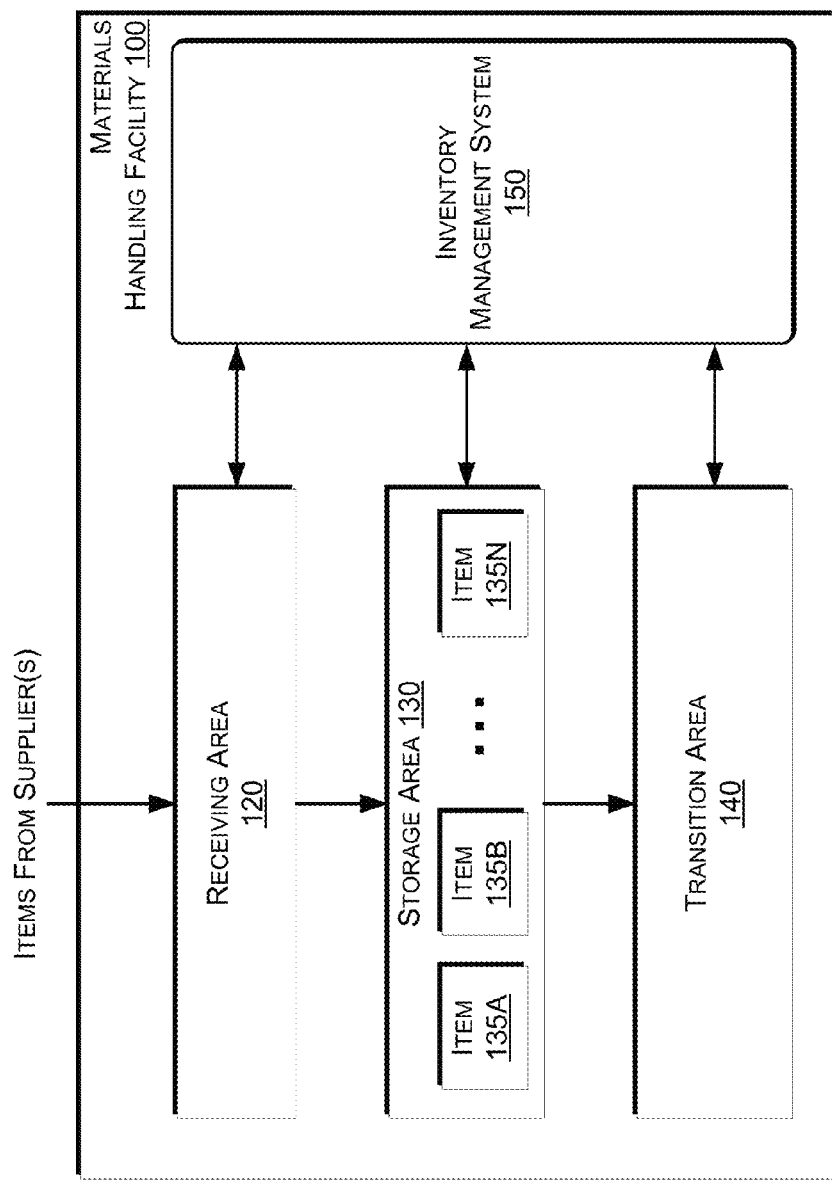
FIG. 1 is a block diagram illustrating a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

This disclosure describes a system for managing inventory as it transitions into a materials handling facility, as it transitions between locations within a materials handling facility and/or as it transitions out of a materials handling facility. In some instances, a user (e.g., picker or picking agent) may retrieve an item from an inventory location and place the item into a tote. The systems described herein detect the item when it is added to the tote. Likewise, when an item is removed from the tote, the removal of that item is detected.

In some implementations, the tote may include an item identifier reader, such as a radio frequency identifier ("RFID") reader, and a receiving component, such as one or more antennas that read an item identifier (e.g., RFID) when the item is placed in and/or removed from the tote. The item identifier reader and receiving component may be part of the tote and in communication with a processor that adds or removes item identifiers from a tote identification list as the items are added or removed from the tote.

When the tote reaches a transition area, such as a rebin station, pack station, another inventory location, shipping, etc. the items on the tote identifier list may be used to transition the inventory to a new location. For example, if the items in the tote are exiting the materials handling facility to be shipped by a carrier to a customer, the transition area may be the area from which the items exit the materials handling facility—such as a loading door where the items are transitioned to the carrier's truck or other transportation unit. When the tote reaches the transition area, the tote identifier list is retrieved and optionally the tote is scanned again to confirm that the items identified in the tote identifier list match those actually in the tote. Any differences between the tote identifier list and a scan of the tote at the transition area may be resolved by a user (e.g., picking agent, packer, customer, carrier) at the transition area. For example, any differences may be presented on a display at the transition area and the user can confirm whether the item is actually included in the tote.

Once any differences have been resolved, the items are transitioned. For example, if the items are exiting the materials handling facility, they may be transitioned from the materials handling facility to the entity that is taking them from the materials handling facility. Continuing with the above example of a carrier taking the items from a materials handling facility for shipment to a customer, the items may be transitioned from the materials handling facility to the carrier. As another example, if the transition area is a rebin station within the materials handling facility, the items may be transitioned from the original storage location (or the tote) to the rebin area. As still another example, if the materials handling facility is a retail location and the customer is purchasing items, when the customer leaves the store (transition area) the items may be transitioned from the materials handling facility to the customer and the customer may be charged for the items. In a similar manner, if the materials handling facility is a rental location, or a library, the transition area may be near the exit of the facility. When the user leaves with items in a tote, the items are transitioned from the materials handling facility to the user that is taking the items. In such a chase, a rental or borrow time may be associated with the items and the user, identifying by when the items are to be returned.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling.

An implementation of a materials handling facility configured to store and manage inventory items is illustrated in FIG. 1. As shown, a materials handling facility 100 includes a receiving area 120, a storage area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, storage areas 130 and transition areas 140 may be interspersed rather than segregated. Additionally, the materials handling facility 100 includes an inventory management system 150 configured to interact with each of receiving area 120, storage area 130 and transition area 140.

The materials handling facility 100 may be configured to receive different kinds of inventory items 135 from various suppliers and to store them until a customer orders or retrieves one or more of the items. The general flow of items through materials handling facility 100 is indicated using arrows. Specifically, as illustrated in this example, items 135 may be received from one or more suppliers, such as manufacturers, distributors, wholesalers, etc. at receiving area 120. In various implementations, items 135 may include merchandise, commodities, perishables, or any suitable type of item depending on the nature of the enterprise that operates materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135 such as bulk products, commodities, etc. may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within storage area 130. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover within a large physical facility, those items 135 may be stored in several different locations to reduce congestion that might occur at a single point of storage.

When a customer order specifying one or more of items 135 is received, or as a user progresses through the materials handling facility 100, the corresponding items 135 may be selected or "picked" from storage area 130. In various implementations, item picking may range from manual to completely automated picking. For example, in one implementation a user may have a list of items they desire and may progress through the materials handling facility picking items 135 from the storage area 130 and placing those items 135 into a tote. In other implementations, materials handling facility employees may pick items 135 using written or electronic pick lists derived from customer orders and place picked items into a tote as the materials handling facility agent progresses through the materials handling facility 100.

As discussed in more detail below, as items are picked and placed in a tote, the tote may be configured to identify the items placed in the tote and manage a tote item identifier list that includes an identifier of each item. After items 135 have been picked and placed in a tote, they may be processed at transition area 140. A transition area may be any designated area within a materials handling facility where items included in the tote are transitioned from one location to another, or from one entity to another. For example, the transition area may be a packing station within the materials handling and when the tote arrives at the packing station (transition area) the items may be transitioned from the storage area 130 to the packing station. Such information may be maintained by the inventory management system 150 to enable accurate tracking of items. In another example, if the items are departing the materials handling facility (e.g., a carrier is taking the items for transport, a customer is purchasing or renting the items), when the tote reaches the transition area the tote item identifier list is obtained and the items are transitioned from the materials handling facility to the new entity (e.g., carrier, customer).

Figure 2:
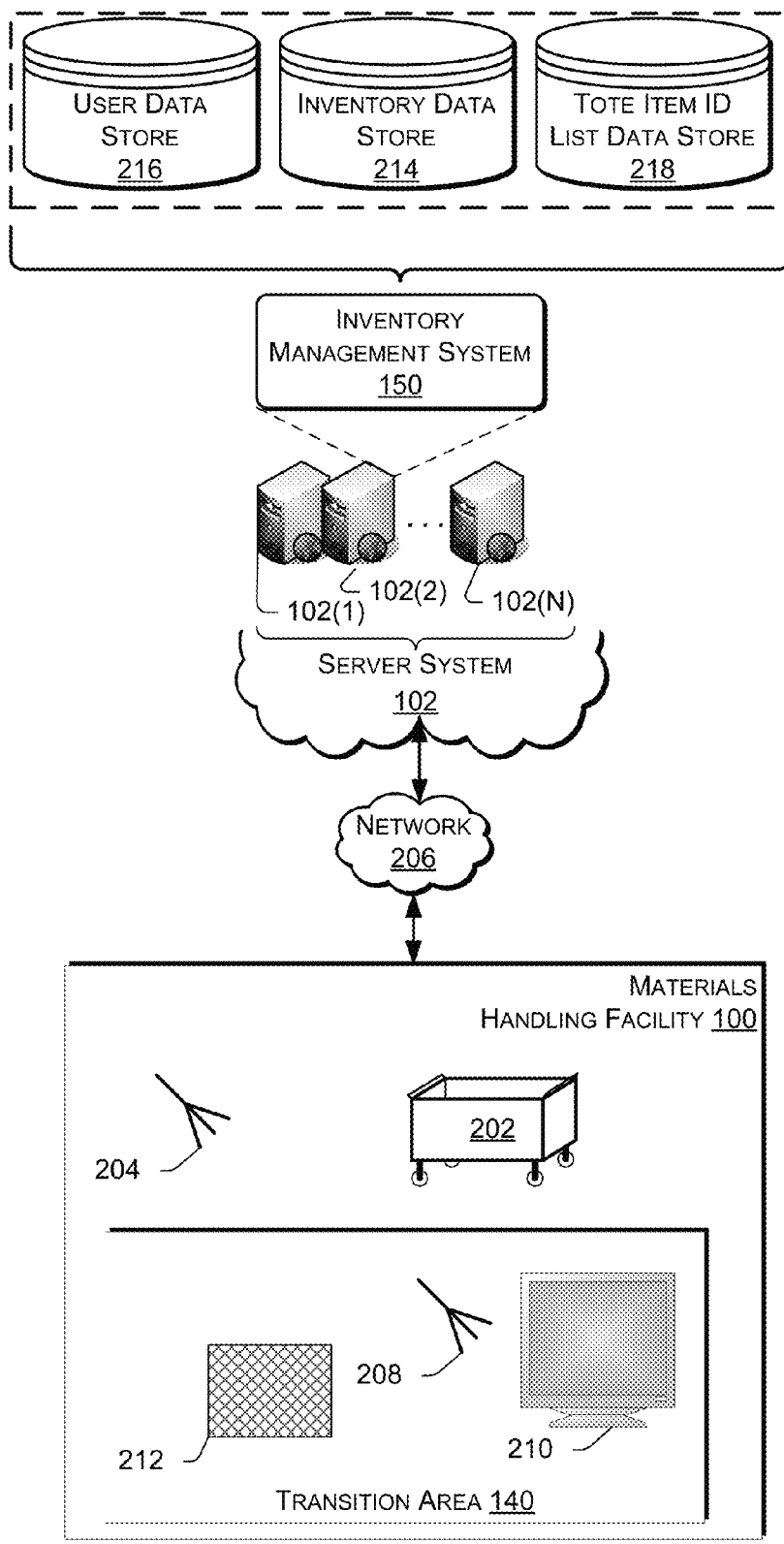
FIG. 2 is a block diagram illustrating additional details of a materials handling facility, according to some implementations.
Figure 3:
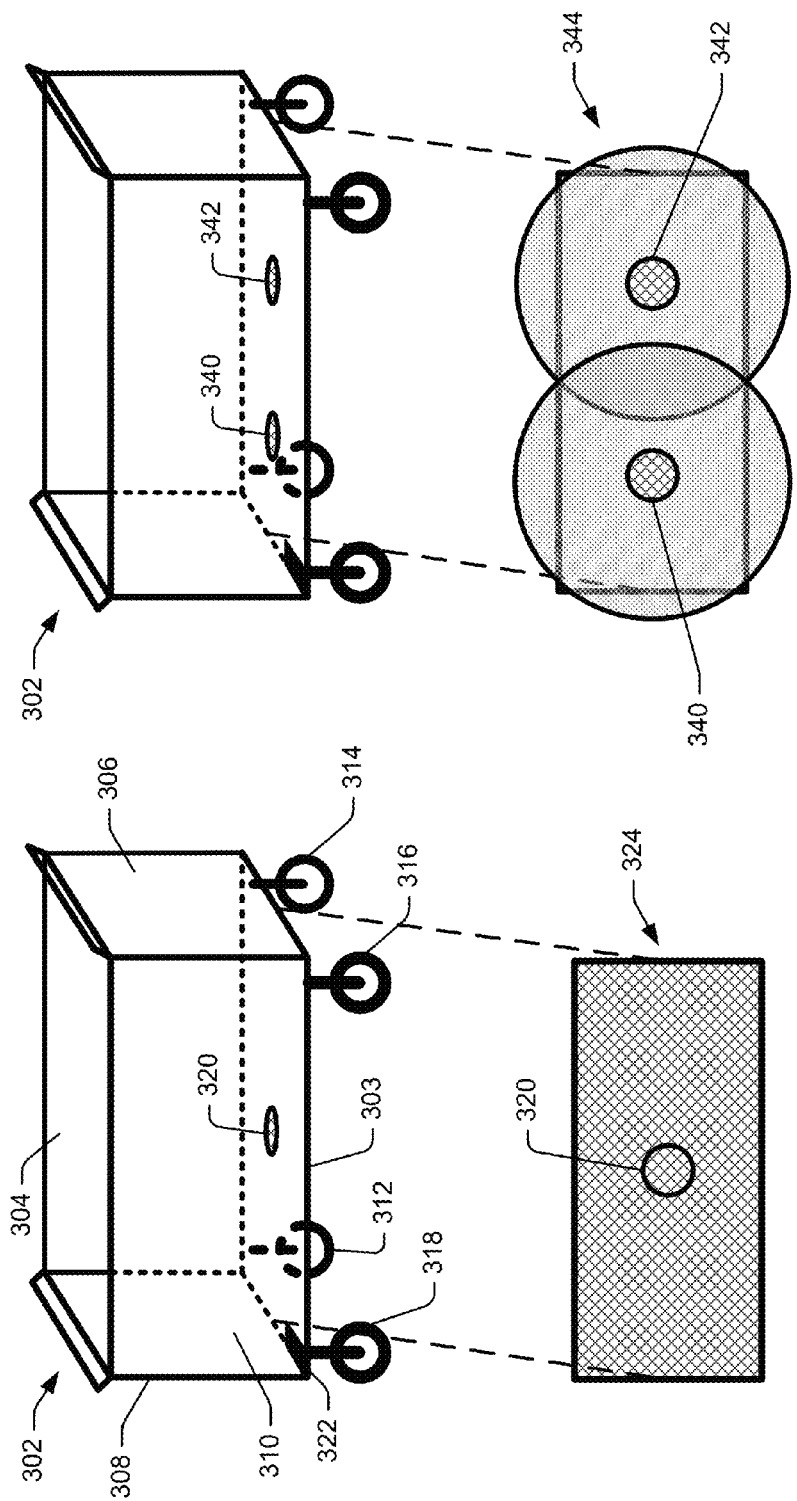
FIGS. 3A, 3B, 4, 5 illustrate example tote configurations, according to some implementations.

To further illustrate, FIG. 2 is a block diagram of additional details of a materials handling facility 100, according to some implementations. A materials handling facility agent, customer, or other individual may utilize a tote 202 to progress through a materials handling facility 100 to pick items 135 from storage areas 130. As items 135 are picked and placed into the tote, an item identifier (e.g., RFID) located on the item is detected and added to a tote item identifier list that identifies the items included in the tote 202. In some implementations, as discussed further below, the tote 202 may include an item identifier reader, such as an RFID reader, and a receiving component, such as one or more antennas that periodically or continuously scan the inside of the tote for item identifiers. Generally, the item identifier reader and/or the receiving component may utilize one or more wireless technologies (e.g., RFID, near field communication ("NFC"), Bluetooth, infrared) to detect item identifiers. When an item identifier is detected, a processor located on the tote 202 may receive the item identifier and record the item identifier in the tote item identifier list which is maintained in a memory located on the tote 202 or maintained by the inventory management system 150. Example implementations of the tote 202 are provided below in more detail with reference to FIGS. 3A-6.

In some instances the tote 202 may operate in conjunction with or may otherwise utilize or communicate with one or more components of the inventory management system 150. Likewise, components of the inventory management system 150 may interact and communicate with the tote 202 as well as identify the user that is utilizing the tote 202 and/or communicate with other components of the materials handling facility 100.

Generally, the inventory management system 150 may include one or more communication devices, such as wireless antennas 204 that facilitate wireless communication (e.g., Wi-Fi, NFC, Bluetooth) between the inventory management system 150 and the tote 202. The inventory management system 150 may also include one or more server system 102 that may be local to the materials handling facility 100, remote from the materials handling facility 100, or any combination thereof.

The inventory management system 150 may utilize antennas 204 within the materials handling facility 100 to create a local wireless network (e.g., Wi-Fi) so that the tote 202 can connect to and communicate with the inventory management system 150. Likewise, in instances when one or more of the components of the inventory management system 150 are remote from the materials handling facility 100, they may communicate with other components of the inventory management system 150 and/or the tote 202 via a network 206.

In some implementations, the tote 202 may be provided to the user (e.g., materials handling facility agent) when the user arrives at the materials handling facility 100. In such an instance, the user may identify themself to the inventory management system 150 and the tote 202 may be associated with the user and/or user's account by associating a unique identifier of the tote 202 with the identified user/user account. Once associated, the user may utilize the tote 202 to place picked items into as the user progresses through the materials handling facility 100. When the user positions the cart in a transition area 140 or progress with the cart through a transition area 140, the items in the tote 202 may be transitioned from the materials handling facility to the user, transitioned from the materials handling facility to a carrier, transitioned from one location (e.g., storage) within the materials handling facility 100 to another location (e.g., packing) within the materials handling facility 100, etc.

When the user leaves the tote 202, such as at the end of a work day, the association between the tote 202 and the user may be removed so that the tote 202 can be reissued to another user when he/she arrives at the materials handling facility 100.

The following is an example use case that utilizes the tote 202 in a materials handling facility 100 to facilitate the picking and transition of items from the materials handling facility. In this example, a user is a materials handling facility employee (e.g., picking agent) that has a badge or other identifier that can be used to identify the user when they arrive at the materials handling facility.

Upon entering the materials handling facility 100, the user is identified by the inventory management system 150 via a wireless network and an antenna 204 accessible within the materials handling facility 100. When the user selects a tote 202 for picking the tote 202 is identified by the inventory management system 150 and a unique identifier, for the tote 202 is associated with the user.

As the user moves around the materials handling facility 100 with the tote 202, picks items 135 from storage areas 130 and places the picked items into the tote 202, the tote identifies the items via an item identifier and includes the added items to a tote item identifier list. The tote item identifier list may also be transmitted to the inventory management system 150 from the tote 202. For example, the tote 202 may communicate with the inventory management system 150 via the antenna 204 and provide the tote item identifier list to the inventory management system 150. In some implementations, the tote 202 may also send to the inventory management system 150 periodic updates to the tote item identifier list as the user adds and removes items from the tote 202.

When the user selects an item 135 from a storage location 130 and places the item in the tote 202, the tote 202 detects the addition of the item and identifies the item. Likewise, when an item is removed from the tote 202, the tote 202 detects the removal of the item and identifies the removed item. When an item is identified as added to the tote 202, the item identifier is added to the tote item identifier list. Likewise, when an item is removed from the tote, the corresponding item identifier is removed from the tote item identifier list. This process of adding and removing item identifiers from the tote item identifier list continues as the user progresses through the materials handling facility 100 adding and removing items. Item addition, removal and identification are discussed further below.

When the user reaches a transition area 140 within the materials handling facility 100, the user and/or the tote 202 are identified, the tote item identifier list retrieved and the items transitioned. In some implementations, a confirmation that the items identified on the tote item identifier list are actually in the tote 202 may be performed at the transition area 140. For example, the transition area 140 may also include an item identifier reader and an antenna 208 that scans the tote 202 to detect the item identifiers included in the tote 202. The detected item identifiers may be provided to the inventory management system 150 in the form of a confirmation item identifier list and compared to those in the tote item identifier list. If the item identifiers included in the confirmation item identifier list match those of the tote item identifier list, the items may be transitioned.

Any differences between the items in the confirmation item identifier list and the tote item identifier list may be presented to the user, or another operator located at the transition area for resolution. For example, differences may be presented on a display 210 and the user and/or operator can verify the cart contents and interact with the inventory management system 150 to resolve the differences. For example, if the tote item identifier list includes an item that was not detected at the transition area 140, the item may be identified via the display 210 to the user/operator at the transition area 140. The user may verify if the item is in the tote 202. If the item is in the tote, the user may notify the inventory management system, such as through a receiving component in communication with the inventory management system 150, that the item is in the tote 202. Once identified, the difference is resolved and the item is either included in the items that are transitioned (if the item is in the tote) or not included in the items that are transitioned (if the item is not in the tote).

In some implementations, the transition area 140 may also have other input/output components that are used to assist in verifying the items in the tote. For example, the transition area 140 may include a scale 212 that is used to weigh the tote and the contained items. The total weight may then be compared to an expected total weight and used as another confirmation point as to whether the items identified in the tote item identifier list are actually in the tote. For example, the inventory management system 150 may maintain weight information in an inventory data store 214 and have knowledge of the weight of the tote. Utilizing this information and the tote item identifier list, the inventory management system 150 can compute an expected total weight for the tote. The expected total weight for the tote may be compared to a weight determined by the scale 212. If the difference is beyond a determined threshold (plus or minus), it may be determined that the items actually included in the tote do not match those identified in the tote item identifier list.

In still another example, the transition area 140 may also include one or more imaging components (not shown) that capture images of the tote and contained items. The images may be analyzed by the inventory management system 150 and compared to images maintained in the inventory data store 214 to assist in determining if the items actually included in the tote correspond with those items identified in the tote item identifier list.

It will be appreciated that any number of analysis techniques may be utilized to assist in confirming that the items included in a tote 202 correspond to those identified in a tote item identifier list, and the ones illustrated herein are provided only as examples.

As discussed above, the tote 202 may communicate with the inventory management system 150 over a variety of communication paths. Generally, the inventory management system 150 may include any number and combination of input components, output components and server system 102. The input components may include an imaging devices, microphones, antennas 204, 208, or any other component that is capable of receiving input about it surrounding environment, from the tote 202 and/or from users. The output components may include projectors, displays 210, antennas 204, 208, speakers and/or any other component that is capable of providing output to its surrounding environment, the tote and/or users.

The inventory management system 150 may also include a server system 102. The server system 102 may be local to the materials handling facility 150, remote from the materials handling facility, or any combination thereof. Likewise, the server system 102 may be configured to communicate over a network 206 with the input components, output components and/or directly with the tote 202.

As illustrated, the server system 102 may be remote from the materials handling facility and implemented as one or more servers 102(1), 102(2), . . . , 102(N) and may, in some instances form a portion of a network-accessible computing platform implemented as a computing infrastructure of processors, storage, software, data access, and so forth that is maintained and accessible by components/device of the inventory management system 150 and/or the tote 202 via a network 206 such as the Internet. The server system 102 does not require end-user knowledge of the physical location and configuration of the system that delivers the services. Common expressions associated for these remote server system 102 include "on-demand computing," "software as a service (SaaS)," "platform computing," "network-accessible platform," "cloud services," "data centers," and so forth.

The network 206 may utilize wired technologies (e.g., wires, USB, fiber optic cable, etc.), wireless technologies (e.g., RF, IR, NFC, cellular, satellite, Bluetooth, etc.), or other connection technologies. The network 206 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

The server system 102 may also include an inventory data store 214, a user data store 216, and a tote data store 218. As discussed further below, the data stores may include lists, arrays, databases, and other data structures used to provide storage and retrieval of data. Likewise, while the disclosure describes multiple data stores, in some implementations, the data stores may be configured as a single data store or multiple data stores.

The inventory data store 114 maintains information about items 135 stored in the storage areas 130 of the materials handling facility 100. For example, the inventory data store 214 may store for each item, the items weight, dimensions, color, expiration date, volume, manufacturer, identifier (e.g., universal product identifier), quantity of items in the storage area, description of the item, etc.

The user data store 216 includes information about users, such as materials handling facility employees, customers, etc. Any type of information may be stored in the user data store 216. For example, user profile information, such as attributes, name, address, gender, purchase history, social networks and/or friends with which the user interacts, and the like may be stored in the user profile data store 216. User profile information may be provided directly by users, such as when they become employed, collected from users when interacting with the inventory management system 150 and/or totes 202, etc.

The tote item identifier list data store 218 may include tote item identifier lists for each tote within the materials handling facility 100. Likewise, the tote item identifier list data store 218 may include information about each tote, such as the unique identifier, the weight of the tote, dimensions of the tote, etc.

The inventory data store 214, user data store 216, and tote data store 218 may be integrated with the server system 102 or otherwise communicatively coupled with the server system 102. For example, one or more of the inventory data store 214, user data store 216, and tote data store 218 may be located at a remote computing resource (not shown) and communicatively coupled with the server system 102. In some implementations, the inventory data store 214, user data store 216, and tote data store 218 may include one or more CD-RW/DVD-RW drives, hard disk drives, solid-state drives, tape drives, or other storage devices that are utilized to store digital content and information. The server system 102, separately or together with the inventory data store 214, user data store 216 and tote data store 218 may provide an inventory management system 150.

The organization and operation of the materials handling facility 100 described above is given as an example. In other implementations, a materials handling facility 100 may be arranged differently and operate differently than described above. For example, some implementations of materials handling facility 100 may not have a dedicated receiving area 120. In such implementations received items may be place directly into the storage area 130. In general, the materials handling facility 100 may employ any organization and operational flow for handling inventory.

FIGS. 3A, 3B, 4, 5 illustrate example tote configurations, according to some implementations. Turning first to FIG. 3A, the tote 302 may include a base surface 303 and a plurality of side surfaces 304, 306, 308, 310 coupled to the base surface 303 and positioned to define a cavity into which items may be placed. In the examples described herein, the totes have four side surfaces 304-310 that are coupled to the base surface 303 to form a cavity having a cube shape. In other implementations, different configurations, numbers and shapes of the base surface 303 and side surfaces 304-310 may be utilized to form any variety, shapes and sizes of cavities. Likewise, the surfaces and/or base of the tote may be of any type of material and have any type of shape, texture and/or size. For example, the surfaces and/or base may be steel, mesh, plastic, metal, etc. In some implementations, one or more of the surfaces and/or base may be of different materials. Generally, the tote may be any structure element into which one or more items may be placed and/or stored. For example, a tote may be a bag, bin, cart, package, box, bowl, etc.

The tote 302 may also include one or more rollers 312, 314, 316, 318 or wheels to assist a user in propelling the tote 302 through a materials handling facility. Likewise, in some implementations the tote 302 may be motorized to assist in propulsion of the tote 302. In still other implementations, the tote 302 may not include rollers 312-318 but instead may be carried by a user. For example, the tote 302 may be configured with one or more handles that enable the user to carry the tote 302 throughout the materials handling facility.

Regardless of the configuration, the tote 302 may include one or more item identifier readers and receiving components 320. For example, the item identifier reader may be a RFID reader, such as a Motorola FX7400, a Motorola MC3190-Z, a Skyetek Module M10, and the like. Likewise, the antenna may be one or more directional antennas, such as a Laird S9025P antenna.

The tote 302 may also include additional functional components 322, such as a processor, computer-readable media, memory, power, etc. Example functional components 322 of a tote are discussed further below with respect to FIG. 6. The functional components may be in communication with the item identifier reader and receiving component 320 and provide power to the item identifier reader and receiving component 320. When an item identifier is detected by the item identifier reader and receiving component 320 it may be provided to the functional components 322 for additional processing. For example, the functional components may add the detected item identifier to a tote item identifier list that is maintained in a memory of the functional components 322. In some implementations, the functional components 322 may also provide the tote item identifier list and/or the received item identifiers individually to the inventory management system 150.

The item identifier reader and receiving component 320 may be configured to detect the presence of item identifiers located within the cavity of the tote 302, but not detect item identifiers not located in the cavity of the tote 302. For example, if the item identifier is a passive RFID, which receives power from the item identifier reader and receiving component 320, the transmitted power and/or the receiving range of the receiving component 320 may be adjusted such that it will only provide power to item identifiers located within the cavity of the tote 302. For example, the power of the item identifier reader and receiving component 320 may be adjusted such that the radiated power only extends to the edges or sides of the tote 302. However, in some configurations, such as that illustrated in FIG. 3A, if the tote 302 is not round shaped, portions of the radiation pattern will extend beyond the cavity of the tote, which could result in item identifiers not within the cavity of the tote 302 being detected.

To reduce the likelihood of detecting item identifiers not within the cavity of the tote 302, in some implementations, the sides 304-310 of the tote may include a radiation shield, such as aluminum, copper, or any other material that eliminates or reduces radio frequency radiation. The top down view 324 of the tote 302 illustrates the radiation pattern from the item identifier reader and receiving component 320 when a shield is included on the sides of the tote 302. As illustrated, rather than the pattern propagating beyond the cavity of the tote 302, the shield included on the walls of the tote of eliminates the radiation beyond the sides of the tote 302 so that item identifiers not located in the cavity of the tote will not be detected.

In other implementations, rather than or in addition to including shields on the sides of the tote, multiple antennas may be used with the item identifier reader. For example, FIG. 3B is a block diagram of a tote 302 with multiple receiving components 340, 342 located on the base surface of the tote 302. By utilizing multiple receiving components positioned within the tote 302, the power radiated from each receiving component can be reduced, yet the radiation pattern will still cover the cavity of the tote and detect item identifiers included in the cavity of the tote. Referring to the top-down view 344 of FIG. 3B, without shielding on the sides of the tote 302, with multiple receiving components 340, 342 the amount of area beyond the tote 302 that is within the radiation of the receiving components 340, 342 is reduced, thereby reducing the likelihood if detecting item identifiers that are not within the cavity of the tote 302. While the example illustrated in FIG. 3B utilizes two receiving components 340, 342 any number of receiving components may be utilized.

In addition to shielding the sides of the tote and/or utilizing multiple antennas, in some implementations, additional techniques may be used to reduce the likelihood of including items on the tote item identifier list that are not in the cavity of the tote 302. For example, the item identifier reader may be configured to only scan for items while the tote 302 is in motion. In such an implementation, the functional components 322 may include an accelerometer, gyroscope, compass and/or other form of motion detection component and instruct the item identifier reader to only scan for item identifiers when the cart is in motion. In such an implementation, the likelihood of detecting an item identifier that is not in the tote 302 as the tote passes by the item identifier is greatly reduced because the item identifier will only potentially be within range of the item identifier reader and receiving component 320 for a brief instance. To further this implementation, it may also be required that an item be detected for a certain period of time (e.g., 5 seconds) before it is considered within the tote cavity 302.

In still other implementations, it may be required that an item identifier be detected multiple times before it is included in the tote item identifier list. For example, if the item identifier reader and antenna periodically scan for item identifiers, each time an item identifier is detected a count of the number of detections is maintained. In such an implementation, a predetermined threshold may exist and the item identifier may only be added to the tote item identifier list when the count of the number of times the item identifier has been detected meets or exceeds the predetermined threshold.

Figure 4:
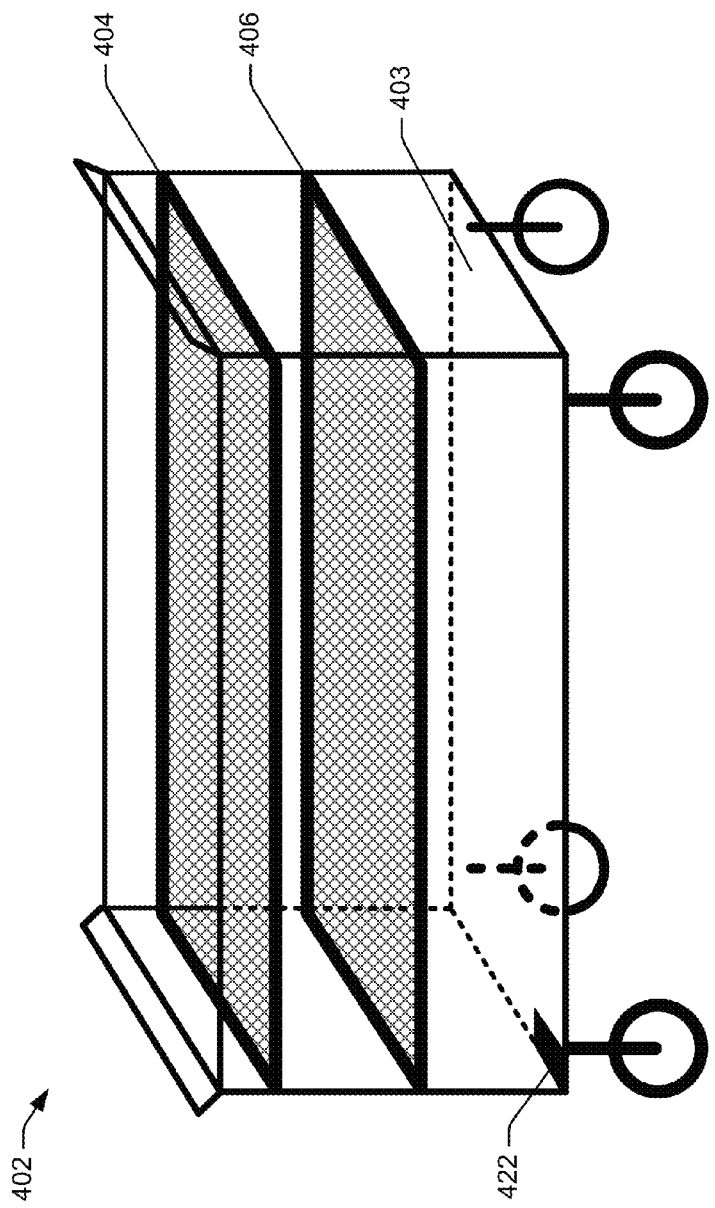

FIG. 4 provides yet another block diagram of a tote 402 that may be used with the various implementations described herein. In this example, the tote 402 may include two receiving components 404, 406. In one implementation, the receiving components may be loop antennas, such as Times-7 Slimline A8060 antennas. The receiving components 404, 406 may be coupled to the sides of the tote such that each antenna's radiation pattern defines a plane within the cavity of the tote 402 that is substantially parallel with the base surface 403 of the tote 402. In one implementation the upper most, or top receiving component 404 may be positioned at or near the top of the tote 402 and the second receiving component 406 may be positioned at a point separated from the first receiving component and below the first receiving component. For example, the second receiving component 406 may be positioned around the sides of the tote 402 at a half-way point between the top of the tote and the base surface of the tote. In other implementations, the second receiving component 406 may be positioned only a few centimeters from the first receiving component 404. The only limitation in positioning the receiving components 404, 406 is that there is sufficient separation such that a time difference may be determined as to when an item passes through the receiving components.

In the example illustrated in FIG. 4, when an item is placed into or removed from the tote 402 it will pass through each plane of the receiving components 404, 406, thereby activating the receiving components 404, 406. The receiving components 404, 406 detect the item identifier as it passes through the respective planes. When the plane is interrupted and the item identifier detected, such information may be provided to the functional components 422 of the tote. In this example, in addition to providing the detected item identifier, a timestamp may also be provided identifying a time when the item passed through the plane of the receiving component 404, 406. As discussed further below with respect to FIG. 8, based on the timestamps received from each receiving component 404, 406 it may be determined whether the detected item identifier was added to or removed from the tote 402. For example, if the plane of the top receiving component 404 was interrupted before the plane of the lower receiving component 406, it may be determined that an item was added to the tote 402. In comparison, if the plane of the lower receiving component 406 was interrupted before the plane of the top receiving component 404, it may be determined that the item was removed from the tote 402.

Figure 5:
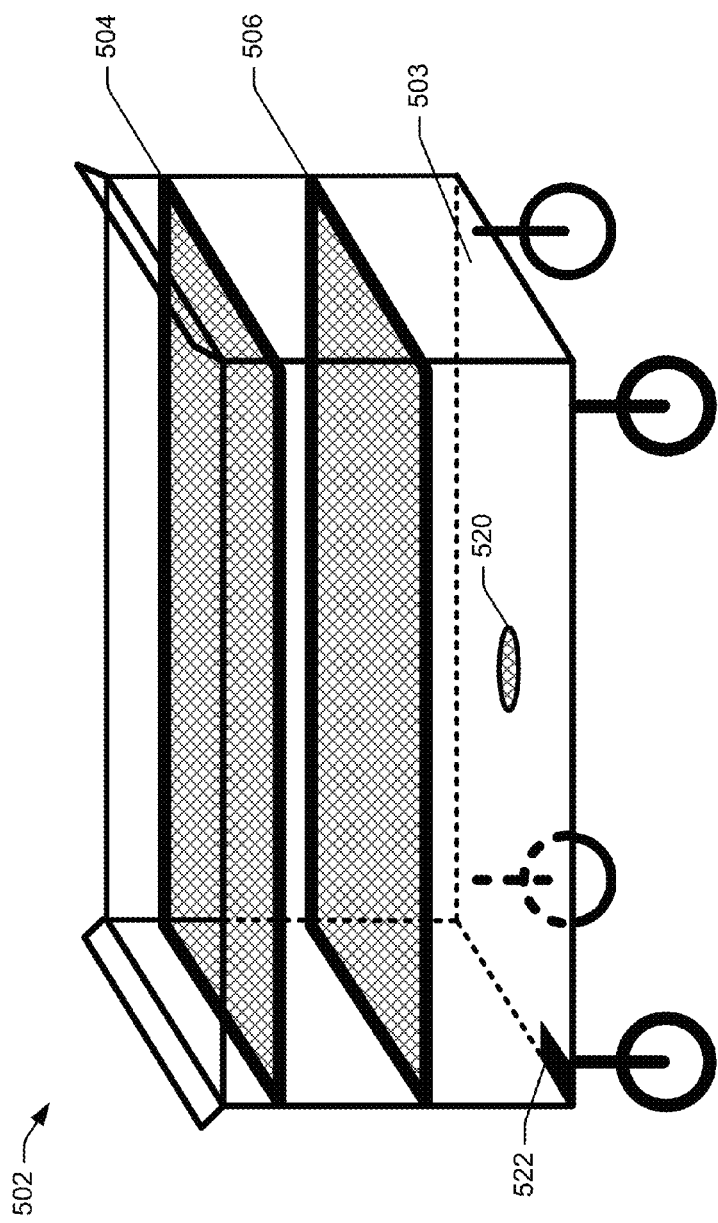

In some implementations, in addition to or as an alternative to using the receiving components to detect the item identifiers, in some implementations the tote 402 may also include a receiving component located on the base surface of the tote that is utilized by the item identifier reader to detect item identifiers, as illustrated in FIG. 5. FIG. 5 is a block diagram of a tote 502 that includes two receiving components 504, 506 positioned around the sides of the tote 502, each defining a plane that is substantially parallel with a base surface 503 of the tote 502. In addition, the tote 502 includes a receiving component 520 that communicates with an item identifier reader included in the functional components 522 of the tote 502. As with the other examples, the item identifier reader, rather than being separate from the receiving components 520 may be included with or include the receiving component 520.

While the examples discussed above refer to the planes of the receiving components being substantially parallel with the base surface of the tote, in other implementations the planes may not be substantially parallel with the base surface of the tote. Generally, the planes may be at any angle with respect to the base surface of the tote and/or each other. The only constraint is that the planes of the receiving components be positioned such that when an item identifier is added to or removed from the tote, it will pass through at least two planes.

In the example illustrated in FIG. 5, the addition and removal of items may be detected by activation of the planes of the receiving components 504, 506 and the receiving component 520 may be utilized to detected a new item identifier (when an item is added to the tote) or the removal of an item identifier (when an item is removed from the tote). In such an implementation, the receiving components 504, 506 may be any component that is capable of detecting whether an item identifier has passed through its plane and provide information to the functional components 522 identifying a timestamp or other identifier that can be used to determine whether the item identifier passed through the plane of the top receiving component or the lower receiving component first.

Figure 7:
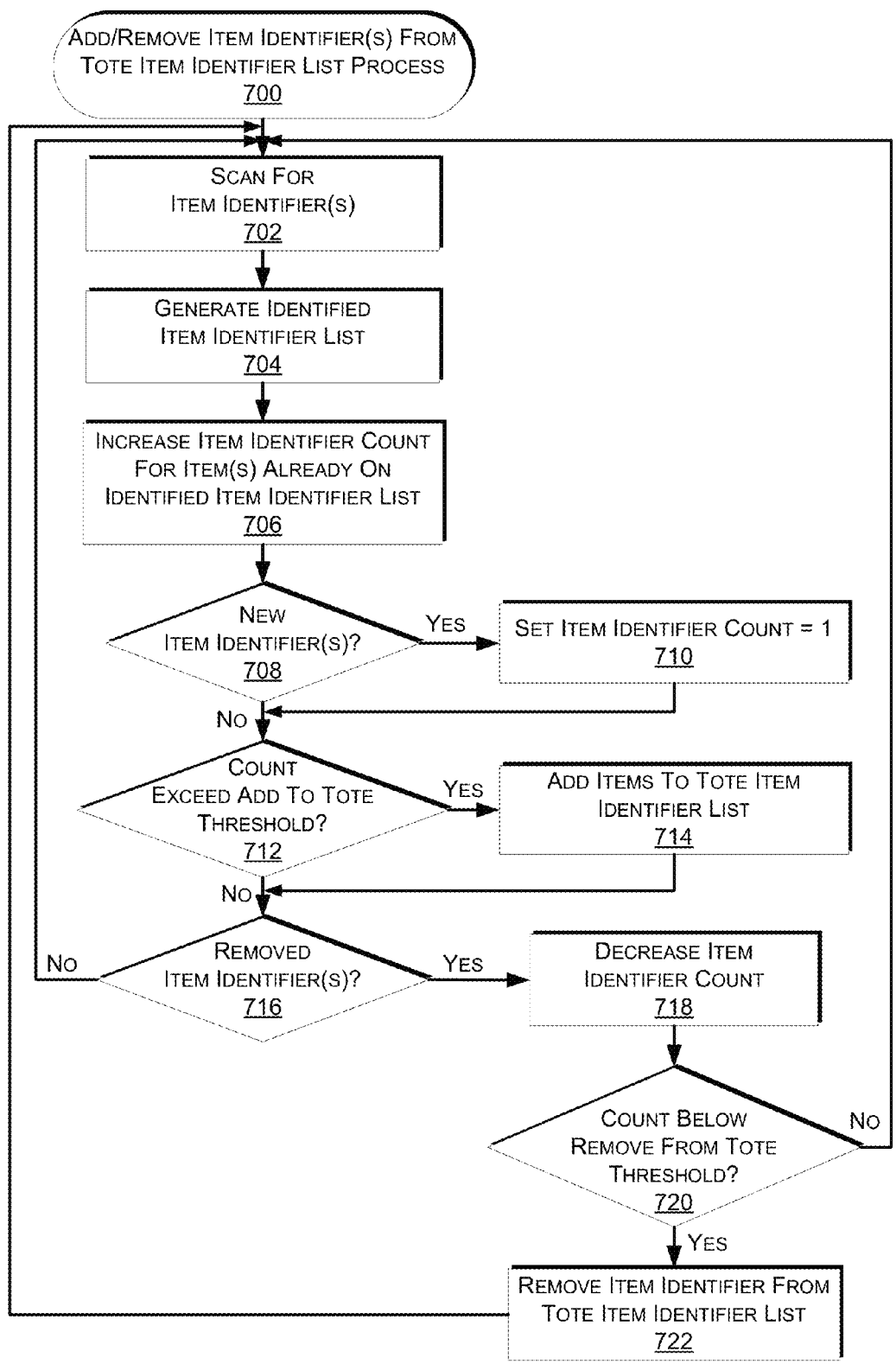
FIG. 7 depicts a flow diagram of a process for identifying the addition and/or removal of item identifier(s) from a tote, according to some implementations.
Figure 8:
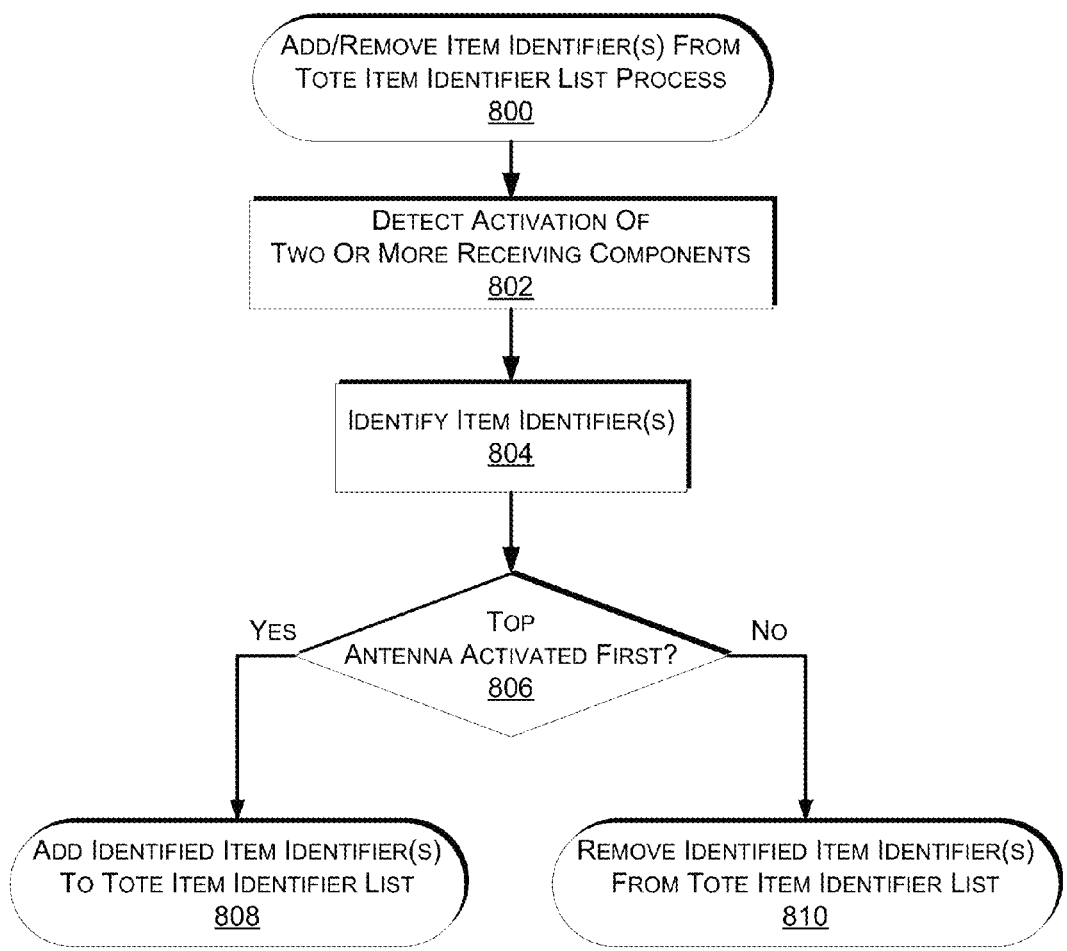
FIG. 8 depicts a flow diagram of a process for identifying the addition and/or removal of item identifier(s) from a tote, according to some implementations.
Figure 9:
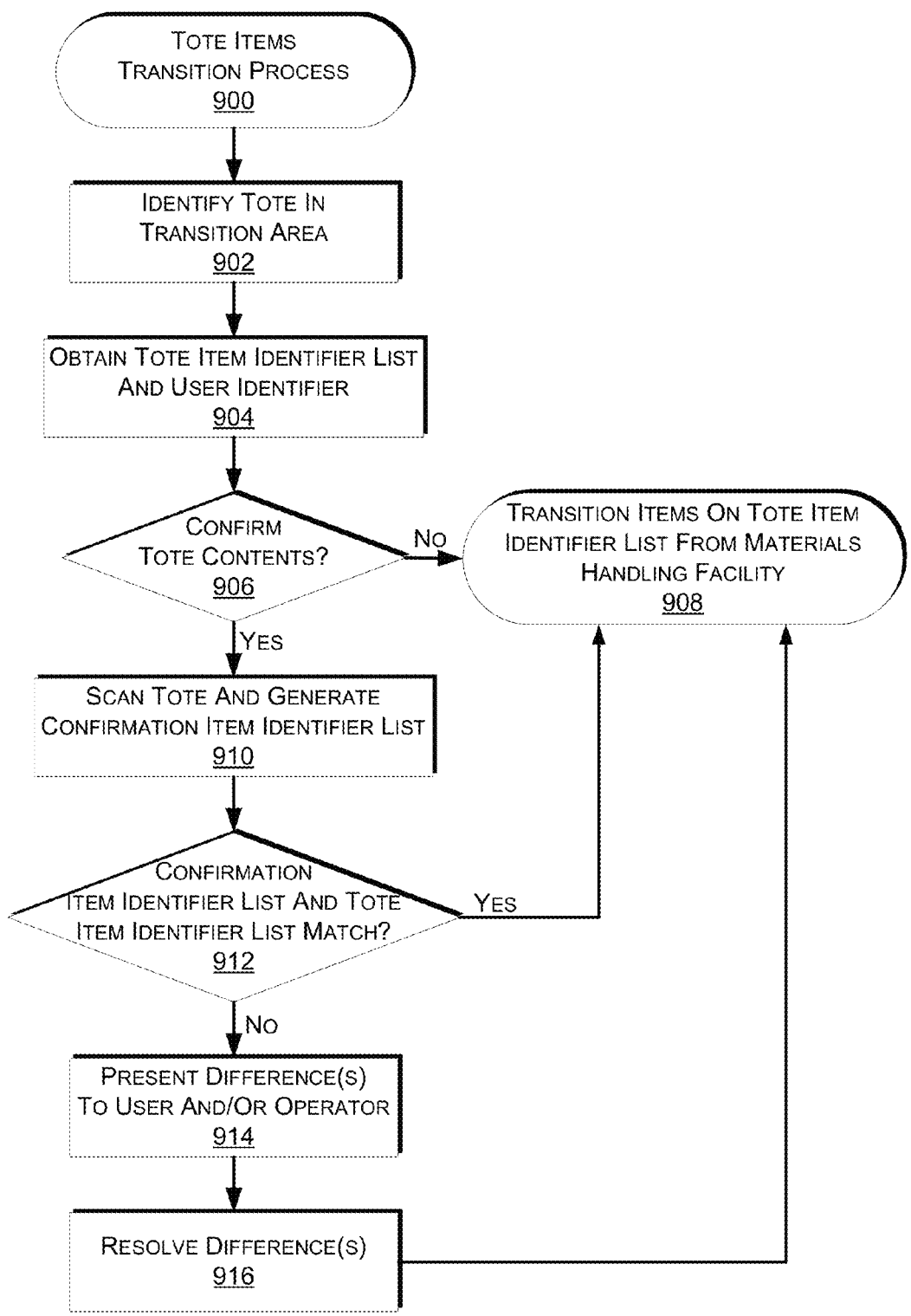
FIG. 9 depicts a flow diagram of a process for transitioning items included in a tote, according to some implementations.

The receiving component 520 may communicate with the item identifier reader and operate in a manner similar to that discussed above with respect to FIGS. 3A, 3B to detect the addition and/or removal of item identifiers from the tote 502. Similarly, like the totes described with respect to FIGS. 3A, 3B, the sides of the tote 502 may be shielded and/or multiple receiving components 520 may be positioned within the tote 502. Likewise, additional processes, such as only scanning for item identifiers while the tote 502 is in motion or maintaining a count threshold that must be exceeded before an item is considered added to the tote 502, may also be utilized. In general, the configurations and examples described with respect to FIGS. 3A, 3B, 4, and 5 may be combined and/or used separately with the implementations described herein. FIGS. 7-9 provide additional examples and description regarding the implementations described herein for utilizing the totes in conjunction with the inventory management system 150 to manage inventory within a materials handling facility.

Figure 6:
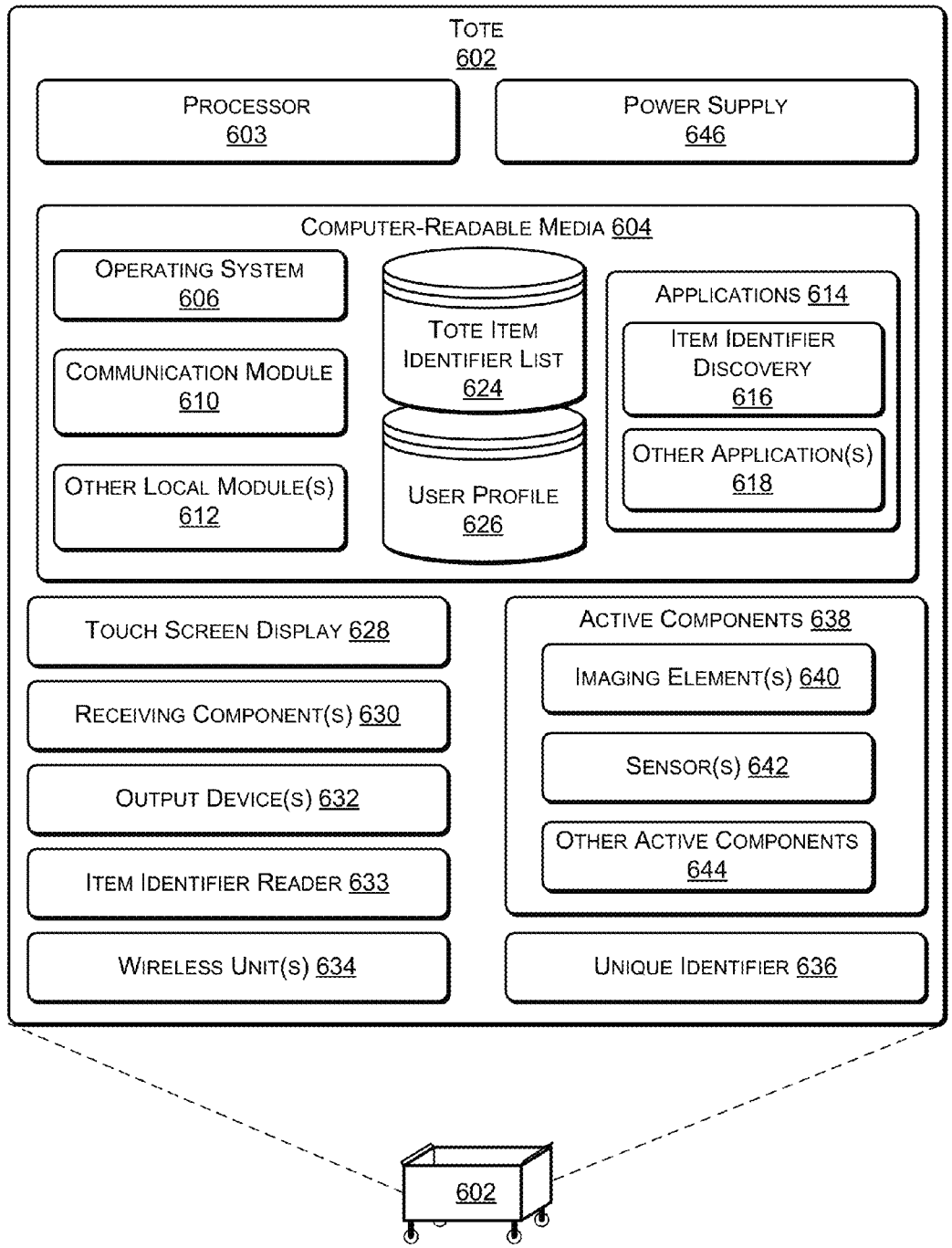
FIG. 6 illustrates example functional components of a tote, such as those illustrated in FIGS. 3A-5, according to some implementations.

FIG. 6 illustrates example functional components of a tote 602, such as those illustrated in FIGS. 3A-5, according to some implementations. The functional components of the tote 602 include one or more processors 603 and computer-readable media 604. The computer-readable media 604 may include volatile and nonvolatile memory, removable and non-removable media implemented in any method or technology for storage of information, such as computer-readable instructions, data structures, program modules, tote item inventor lists, user profiles, or other data. Such memory includes, but is not limited to, RAM, ROM, EEPROM, flash memory or other memory technology. The computer-readable media 604 may be implemented as computer-readable storage media ("CRSM"), which may be any available physical media accessible by the processor(s) 602 to execute instructions stored on the media 604. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 602.

Several modules such as instruction, data stores, and so forth may be stored within the computer-readable media 604 and configured to execute on the processor(s) 602. A few example functional modules are shown stored in the computer-readable media 604, although the same functionality may alternatively be implemented in hardware, firmware, or as a system on a chip (SOC).

An operating system module 606 may be configured to manage hardware and services within and coupled to the tote 602 for the benefit of other modules. A communication module 610 facilitates communication, such as cellular communication, RF communication, Wi-Fi communication, Bluetooth communication, NFC, satellite-based communication, and so forth. For example, the communication module 610 may facilitate communication with the inventory management system 150 via the network 206 or over another wired and/or wireless communication path. Likewise, the communication module 610 may facilitate communication and detection of item identifiers. Other local modules 612 may also be present on the tote 602, depending upon the implementation and configuration of the tote 602.

The tote 602 may also include a plurality of applications 614 stored in the computer-readable media 604 or otherwise accessible to the tote 602. In this implementation, the applications 614 include an item identifier discovery 616 and other applications 618. However, the tote 602 may include any number or type of applications and is not limited to the specific example shown here. The item identifier discovery 616 application may facilitate item identifier discovery as items are added to and/or removed from the tote 602. Data stores may also be stored locally on the media 604, including a tote item identifier list data store 624 and one or more user profiles 626 of users that have interacted with and/or use the tote 602. The tote item identifier list data store 624 may include a list of item identifiers that have been detected as present with the cavity of the tote 602 and/or a count of a number of times each item identifier 602 has been detected. The user profile(s) data store 626 may include user characteristics, preferences, pick lists, usage history, purchase history, and other information specific to an individual user.

The tote 602 may also include a display, such as a touch screen display 628, as well as other input devices, like a keypad, control buttons, microphones, motion detection components, etc. Output devices 632 may include a display, an illumination element (e.g., LED), a vibrator to create haptic sensations, microphone(s) or the like. The tote 602 might further include an item identifier reader 633, such as an RFID reader that couples to a receiving component 630 to facilitate detection of item identifiers. Likewise, the tote 602 might include a wireless unit 634 coupled to another antenna to facilitate a wireless connection to one or more networks, such as the network 206. The wireless unit 634 may implement one or more of various wireless technologies, such as Wi-Fi, Bluetooth, RF, and so on.

The tote 602 may also include an embedded unique identifier 636. The unique identifier may be embedded into a memory 604 of the wearable device 305 or otherwise stored and accessible by the tote 602.

The tote 602 may also be equipped with multiple active components 638. Any number of components may be used. Representative components include imaging elements 640, sensors 642 and other active components 644. The tote 602 may also include some form of power supply 646, such as a battery, solar power, or other form of power supply for providing power to the tote 602 and its components during operation.

While the functional components of the example tote 602 are discussed herein as part of the tote 602, in other implementations, one or more of the functional components may be distributed throughout the materials handling facility 100 and/or implemented as part of the inventory management system 150. For example, one or more of the applications, such as the item identifier discovery application 616 may be implemented as part of the inventory management system 150. In such an example, when the item identifier reader 433 detects an item identifier, it may be provided directly to the inventory management system 150 and the inventory management system may discover the item and add the item identifier to the tote item identifier list. Likewise, the tote item identifier list 624 may be maintained in the computer-readable media 604 of the tote 602 and/or in the tote item identifier list data store 218 of the inventory management system 150.

FIG. 7 depicts a flow diagram of an example process 700 for identifying the addition and/or removal of item(s) from a tote, according to some implementations. The example process 700 may be implemented with any of the tote configurations discussed above. The process of FIG. 7 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 700 begins by scanning for item identifiers, as in 702. For example, a tote may be configured to include an item identifier reader and one or more receiving components (e.g., antennas) that can be used to scan for item identifiers. In some implementations, the item identifiers utilized in a materials handling facility may be passive RFID readers. The item identifier reader and antenna may scan for item identifiers and those within range of the receiving component may receive power from the receiving component such that they can be detected. In other implementations, the item identifiers may be self-powered, or partially self-powered such that they are detectable.

Based on the item identifiers detected during the scan, a detected item identifier list may be generated, or updated if one already exists, as in 704. The detected item identifier list may include each item identifier detected while scanning for item identifiers along with a count as to the number of times the item identifier has been detected. For each detected item identifier that is already in the detected item identifier list it may have its identifier count increased, as in 706. Likewise, a determination may be made as to whether any new item identifiers were detected during the scan, as in 708. New item identifiers may be any detected item identifiers that are not already included on the detected item identifier list.

If it is determined that new item identifiers were detected during the scan, the item identifiers are added to the detected item identifier list and the corresponding item identifier count is set to 1, as in 710. If it is determined that no new item identifiers were detected, or after adding new item identifiers to the detected item identifier list, it may be determined whether a count for any item identifiers not already included on a tote item list exceed an add to tote threshold, as in 712. As discussed above, to improve accuracy of item identifiers included on a tote item identifier list, an add to tote threshold may be established and an item identifier only added to the tote item identifier list when the count for that item identifier exceeds the threshold. The add to tote threshold may be any determined value. In some implementations, that add to tote threshold may be zero such that the first time an item identifier is detected it is added to the tote item identifier list. In other implementations, the add to tote threshold may be any number greater than zero, and the item identifier will only be added to the tote item identifier list when the identifier count meets or exceeds that threshold.

If it is determined that the identifier count for an item identifier not already included on the tote item identifier list meets or exceeds the add to tote threshold, the item identifier may be added to the tote item identifier list, as in 714. However, if it is determined that the identifier count does not meet or exceed the threshold, or after adding items with identifier counts that do meet or exceed the item identifier threshold to the tote item identifier list, a determination may be made as to whether any item identifiers in the detected item identifier list were not detected, as in 716. If there were no missing item identifiers, the example process 700 may return to block 702 and continues. However, if it is determined that an item identifier included on the detected item identifier list was not detected during the scan for item identifiers, the identifier count for that item identifier may be decreased, as in 718, and a determination may be made as to whether the count for any item identifiers on the tote item identifier list has fallen blow a remove from tote threshold, as in 720.

In some implementations, the add to tote threshold and the remove from tote threshold may be the same value and/or the same threshold. In other implementations, the value of the add to tote threshold and the value of the remove from tote threshold may be different. Like the add to tote threshold, the remove from tote threshold may be any determined value. For example, the remove from tote threshold may have a value of zero. So long as the identifier count for an item identifier that has already been added to the tote item identifier list is greater than zero, the item identifier will remain in the tote item identifier list. In other implementations, the remove from tote item identifier list may be any value greater than zero. In still other implementations, rather than a count value, the remove from tote threshold may consider how many scans have been performed successively in which the item identifier has not been detected. For example, the remove from tote threshold may be set such that an item identifier will be removed from the tote item identifier list if the scan for item identifiers (block 702) is performed five times and the item identifier is not detected in any of those scans.

If it is determined that the count for an item identifier included in the tote item identifier list is below the remove from tote threshold, the item identifier is removed from the tote item identifier list, as in 722. After removing the item identifier from the tote item identifier list, or if it is determined that the identifier count has not fallen below the remove from tote threshold, the example process returns to block 702 and continues. The example process 700 may be performed on a periodic basis, continually, or upon the occurrence of particular events (e.g., the tote is moving, the addition and/or removal of an item is detected).

FIG. 8 depicts a flow diagram of an example process 800 for identifying the addition and/or removal of item(s) from a tote, according to some implementations. The example process 800 may be implemented with the tote configurations discussed above with respect to FIGS. 4 and 5. The example process 800 begins when two or more receiving components of a tote are activated, as in 802. For example, if the tote has two loop antennas (receiving component s) positioned within the tote such that each defines a plane substantially parallel to the base surface of the tote, when an item is added to or removed from the tote, both loop antennas will be activated as the item passes through the respective planes.

Upon detection of two or more receiving components of the tote being activated, the item identifier that caused the receiving components to be activated is identified, as in 804. For example, if the receiving components are loop antennas that are in communication with the item identifier receiver, the item identifier may be detected as the item passes through each plane. In an alternative implementation, the item identifier may be determined utilizing the example process 700. In addition to identifying the item identifier, it may be determined whether the top receiving component was activated first, as in 806. For example, time stamps or other identifiers that indicate when the receiving component was activated may be compared to determine which receiving component was activated first. If it is determined that the top receiving component was activated first, which means and item was added to the cart, the identified item identifier may be added to the tote item identifier list, as in 808. However, if it is determined that the top receiving component was not activated first, which means the item was removed from the cart, the item identifier may be removed from the item identifier list, as in 810.

FIG. 9 depicts a flow diagram of an example process 900 for transitioning items included in a tote, according to some implementations. The example process begins when a tote enters a transition area, as in 902. A tote may be identified in a transition area based on a unique identifier associated with the tote and/or based on the user that is associated with the tote. Upon identifying the tote, the tote item identifier list for that tote is obtained, as in 904. In some implementations, the user identifier and/or user account may also be determined. In some implementations, the tote item identifier list is maintained in the memory of the tote and when the tote is identified as in the transition area, the tote item identifier list may be provided to the inventory management system. In other implementations, the tote item identifier list may be maintained by the inventory management system. In still other implementations, the tote item identifier list may be maintained by both the tote and the inventory management system.

The example process 900 may also determine whether to confirm that the items in the tote correspond with the items identified on the tote item identifier list, as in 906. If it is determined that the tote contents are to be confirmed, the tote may be scanned and a confirmation item identifier list may be generated, as in 910. For example, a higher power item identifier reader and antenna may be located within the transition area that is in communication with the inventory management system that scans the tote to identify the item identifiers located in the tote. In some implementations, the antenna may be positioned on the ceiling, floor and/or wall of the transition area such that it can scan the tote for item identifiers as it enters the transition area.

Once the tote has been scanned in the transition area and a confirmation item identifier list generated, the item identifiers on the confirmation item identifier list may be compared with the items on the tote item identifier list and a determination made as to whether the items on the two lists match, as in 912. If there is a difference between the item identifiers listed on the confirmation item identifier list and the tote item identifier list, the differences may be presented to the user and/or an operator located in the transition area, as in 914. For example, any differences may be presented on a display located in the transition area and the user and/or operators can manually resolve the differences by selecting whether the item is included in the tote or not, as in 916.

Once any differences have been resolved, if it is determined that all items on the confirmation item identifier list and the tote item identifier list match, or if it is determined not to confirm the contents of the tote, the items identified in the tote item identifier list are transitioned, as in 908. For example, if the items are exiting the materials handling facility, the items may transition from the materials handling facility to a new owner, carrier, etc. that is taking the items from the materials handling facility. If the items are transitioning from one location to another within the materials handling facility the items may be transitioned between those locations.

Figure 10:
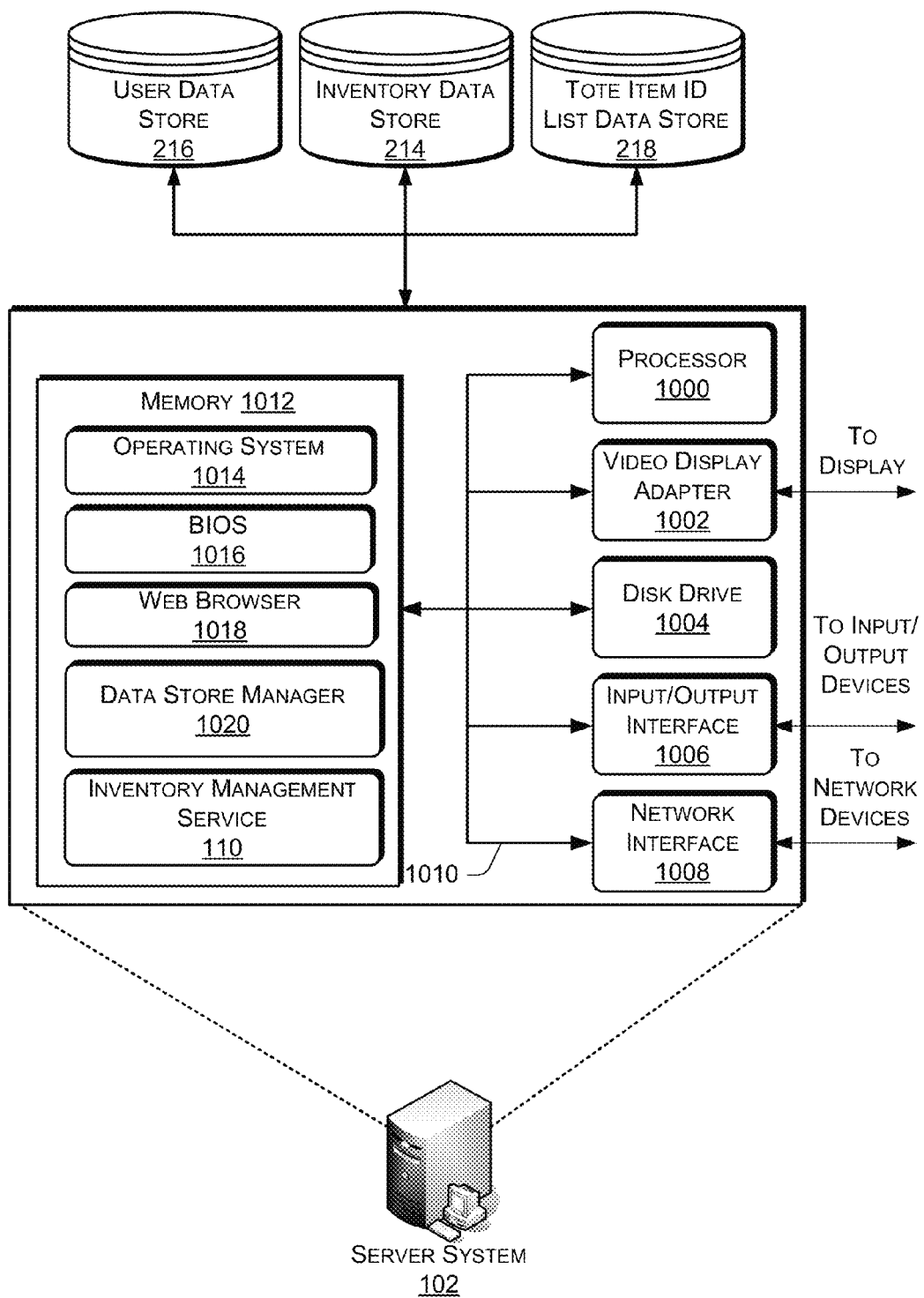
FIG. 10 is a block diagram of an illustrative implementation of a server system that may be used with various implementations.

FIG. 10 is a pictorial diagram of an illustrative implementation of a server system, such as the server system 102, that may be used in the implementations described herein. The server system 102 may include a processor 1000, such as one or more redundant processors, a video display adapter 1002, a disk drive 1004, an input/output interface 1006, a network interface 1008, and a memory 1012. The processor 1000, the video display adapter 1002, the disk drive 1004, the input/output interface 1006, the network interface 1008, and the memory 1012 may be communicatively coupled to each other by a communication bus 1010.

The video display adapter 1002 provides display signals to a local display (not shown in FIG. 10) permitting an operator of the server system 102 to monitor and configure operation of the server system 102 and/or to resolve differences between items identified in a tote item identifier list and a confirmation item identifier list. The input/output interface 1006 likewise communicates with external input/output devices not shown in FIG. 10, such as a mouse, keyboard, scanner, or other input and output devices that can be operated by an operator of the server system 102. The network interface 1908 includes hardware, software, or any combination thereof, to communicate with other computing devices. For example, the network interface 1908 may be configured to provide communications between the server system 102 and other computing devices, such as tote, via the network 206, as shown in FIG. 2.

The memory 1012 generally comprises random access memory (RAM), read-only memory (ROM), flash memory, and/or other volatile or permanent memory. The memory 1012 is shown storing an operating system 1014 for controlling the operation of the server system 102. A binary input/output system (BIOS) 1016 for controlling the low-level operation of the server system 102 is also stored in the memory 1012.

The memory 1012 additionally stores program code and data for providing network services that allow totes and/or the object management system 150. Accordingly, the memory 1012 may store a browser application 1018. The browser application 1018 comprises computer executable instructions, that, when executed by the processor 1000 generate or otherwise obtain configurable markup documents such as Web pages. The browser application 1018 communicates with a data store manager application 1020 to facilitate data exchange between the inventory data store 214, the user data store 216, and/or the tote item identifier list data store 218.

As used herein, the term "data store" refers to any device or combination of devices capable of storing, accessing and retrieving data, which may include any combination and number of data servers, databases, data storage devices and data storage media, in any standard, distributed or clustered environment. The server system 102 can include any appropriate hardware and software for integrating with the data stores 214-218 as needed to execute aspects of one or more applications for the tote 202, and/or the inventory management system 150.

The data stores 214-218 can include several separate data tables, databases or other data storage mechanisms and media for storing data relating to a particular aspect. For example, the data stores 214-218 illustrated include mechanisms for inventory information, user information, tote item identifier lists, tote information, etc. which can be used to generate and deliver information to totes 202, the inventory management system 150 and/or users.

It should be understood that there can be many other aspects that may be stored in the data stores 214-218. The data stores 214-218 are operable, through logic associated therewith, to receive instructions from the server system 102 and obtain, update or otherwise process data in response thereto.

In addition to maintaining information about inventory, users, and totes, the inventory management system 150 may provide use information back to the users. For example, the inventory management system 150, through communication between the server system 102 and a tote, may provide use information back to a user. Such information may include a list of the items included in the tote, the cost of items included in the tote, items remaining to be picked before the tote is to progress to the transition area, the location within the materials handling facility of items to be picked, and the like.

The memory 1012 may also include the inventory management system 150, discussed above. The inventory management system 150 may be executable by the processor 1000 to implement one or more of the functions of the server system 102. In one implementation, the inventory management system 150 may represent instructions embodied in one or more software programs stored in the memory 1012. In another implementation, the inventory management system 150 can represent hardware, software instructions, or a combination thereof.

The server system 102, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction in FIG. 10 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A tote configured to identify items contained in the tote, the tote comprising:
    a base surface;
    a plurality of side surfaces coupled to the base surface and positioned to define a cavity;
    a first antenna coupled to at least one of the plurality of side surfaces and defining a first plane substantially parallel with the base surface, the first antenna configured to detect an interruption of the first plane as an item passes through the first plane;

a second antenna coupled to at least one of the plurality of side surfaces and defining a second plane substantially parallel with the base surface, the second antenna configured to detect an interruption of the second plane as the item passes through the second plane;

a computing system coupled to the tote and in communication with the first antenna and the second antenna, the computing system including:

one or more processors; and a memory coupled to the one or more processors and storing program instructions that when executed by the one or more processors cause the one or more processors to at least:

receive from the first antenna first information, the first information indicating that the first plane was interrupted;

receive from the second antenna second information, the second information indicating that the second plane was interrupted;

determine an item identifier corresponding to the item;

increase a count for the item identifier;

determine that the count for the item identifier exceeds a threshold; and based on the determination that the count for the item identifier exceeds the threshold, add the item identifier to a tote item list.

2. The tote as recited in claim 1, wherein at least one of the first antenna and the second antenna is a radio frequency loop antenna.

3. The tote as recited in claim 1, wherein at least one of the first antenna and the second antenna is configured to detect the item identifier as the item passes through one or more of the first plane or the second plane.

4. The tote as recited in claim 1, wherein:

the first information indicates a first time that the first plane was interrupted;

the second information indicates a second time that the second plane was interrupted; and the program instructions further causing the one or more processors to at least:

determine that the item was added to the tote based at least in part on a determination that the interruption of the first plane occurred prior to the interruption of the second plane.

5. The tote as recited in claim 1, further comprising:

a third antenna coupled to the tote, the third antenna configured to detect the item identifier when the item identifier is positioned in the cavity.

6. An apparatus, comprising:

a base surface;

a plurality of side surfaces coupled to the base surface and positioned to define a cavity;

a first receiving component positioned within the cavity and defining a first plane, the first receiving component configured to detect an interruption of the first plane as an item passes through the first plane;

a second receiving component positioned within the cavity and defining a second plane, the second receiving component configured to detect an interruption of the second plane as the item passes through the second plane;

a computing system coupled to the apparatus and in communication with the first receiving component and the second receiving component, the computing system including:

one or more processors; and a memory coupled to the one or more processors and storing program instructions that when executed by the one or more processors cause the one or more processors to at least:

receive from the first receiving component a first information, the first information indicating that the first plane was interrupted;

receive from the second receiving component second information, the second information indicating that the second plane was interrupted;

determine an item identifier corresponding to the item;

increase a count for the item identifier;

determine that the count for the item identifier exceeds a threshold; and based on the determination that the count for the item identifier exceeds the threshold, add the item identifier to a tote item list.

7. The apparatus of claim 6, wherein at least one of the first receiving component and the second receiving component is a loop antenna.

8. The apparatus of claim 6, wherein at least one of the first information and the second information include the item identifier.

9. The apparatus of claim 6, wherein the first plane and the second plane are substantially parallel.

10. The apparatus of claim 9, wherein the first plane is substantially parallel with the base of the apparatus.

11. The apparatus of claim 6, wherein:

the first information includes a first time identifying when the first plane was interrupted;

the second information includes a second time identifying when the second plane was interrupted; and the program instructions further cause the one or more processors to determine whether the item was added to the apparatus or removed from the apparatus based at least in part on a comparison of the first time and the second time.

12. The apparatus of claim 11, wherein it is determined that the item is added to the apparatus is further based on a determination that the first time is prior to the second time.

13. The apparatus of claim 11, wherein it is determined that the item is removed from the apparatus if the second time is prior to the first time.

14. A computer-implemented method for managing a tote item list for a tote, comprising:

under control of one or more computing systems configured with executable instructions, scanning a cavity of the tote to identify a plurality of item identifiers included in the tote;

identifying a first item identifier of the plurality of item identifiers included in the tote that is included in the tote item list;

determining that a second item identifier of the identified plurality of item identifiers is not included in the tote item list;

updating the tote item list to include the second item identifier;

determining a third item identifier included in the tote item list that is not in the identified plurality of item identifiers included in the tote;

decreasing a count for the third item identifier;

determining that the count for the third item identifier is less than a threshold; and removing from the tote item list the third item identifier.

15. The computer-implemented method of claim 14, wherein identifying the first item identifier of the plurality of item identifiers included in the tote that is included in the tote item list, includes increasing a second count associated with the first item identifier.

16. The computer-implemented method of claim 14, wherein the cavity of the tote is scanned using at least one antenna located in the cavity of the tote.

17. The computer-implemented method of claim 14, further comprising:

increasing a second count for the second item identifier;

determining that the second count for the second item identifier exceeds an add to tote threshold; and wherein updating the tote item list to include the second item identifier is in response to determining that the second count for the second item identifier exceeds the add to tote threshold.

18. An apparatus, comprising:

a base surface;

a plurality of side surfaces coupled to the base surface and positioned to define a cavity;

a first receiving component configured to detect an item as the item enters or exits the cavity;

a second receiving component configured to detect an item as the item enters or exits the cavity;

a computing system in communication with the first receiving component, the computing system including:

one or more processors; and a memory coupled to the one or more processors and storing program instructions that when executed by the one or more processors cause the one or more processors to at least:

receive from the first receiving component first information indicating that a first item was detected by the first receiving component;

receive from the second receiving component second information indicating that the first item was detected by the second receiving component;

determine, based at least in part on the first information and the second information, that the item entered the cavity;

based at least in part on the determination, increase a count for an item identifier representative of the item;

determine that the count for the item identifier exceeds a threshold; and based at least in part on the determination that the count for the item identifier exceeds a threshold, add the item identifier to a tote item list, wherein the tote item list is associated with a user.

19. The apparatus of claim 18, wherein:

the first information further includes a first timestamp representative of a first time at which the first receiving component detected the first item; and the second information further includes a second timestamp representative of a second time at which the second receiving component detected the first item.

20. The apparatus of claim 19, wherein the program instructions that cause the computing system to determine that the item entered the cavity further cause the computing system to at least:

compare the first timestamp and the second timestamp to determine that the first item was detected by the first receiving component at a time before the second receiving component detected the first item.

21. The apparatus of claim 19, wherein the program instructions that when executed by the one or more processors further cause the one or more processors to at least:

determine the item identifier corresponding to the item.

22. A method, comprising:

scanning a tote with a first antenna to detect a first plurality of item identifiers;

scanning the tote with a second antenna to detect a second plurality of item identifiers;

determining that an item identifier included in at least one of the first plurality of item identifiers or the second plurality of item identifiers is not included in a tote item list;

increasing an item count for the item identifier;

determining a second item identifier included in the tote item list that is not included in the plurality of item identifiers;

decreasing a count for the second item identifier;

determining that the count for the second item identifier is less than a threshold; and in response to determining that the count is less than the threshold, removing from the tote item list the second item identifier.

23. A method, comprising:

detecting a plurality of item identifiers;

determining that an item identifier included in a list is not in the identified plurality of item identifiers;

decreasing a count of the item identifier;

determining that the count for the item identifier is below a threshold; and in response to determining that the count for the item identifier is below the threshold, removing item identifier from the list.

24. The method of claim 23, wherein detecting includes:

detecting the plurality of item identifiers when the item identifiers are included in a tote.

* * * * *